United States Patent
Ning et al.

(10) Patent No.: US 10,775,406 B2
(45) Date of Patent: Sep. 15, 2020

(54) TESTING DEVICE AND METHOD FOR MEASURING ADHESION FORCE BETWEEN GAS HYDRATE AND MINERAL PARTICLES

(71) Applicant: China University of Geosciences (Wuhan), Wuhan (CN)

(72) Inventors: Fulong Ning, Wuhan (CN); Li Peng, Wuhan (CN); Wei Li, Wuhan (CN); Dongdong Wang, Wuhan (CN); Wenjia Ou, Wuhan (CN); Zhichao Liu, Wuhan (CN); Jiaxin Sun, Wuhan (CN); Wan Cheng, Wuhan (CN); Guosheng Jiang, Wuhan (CN); Ling Zhang, Wuhan (CN)

(73) Assignee: China University of Geosciences (Wuhan), Wuhan (CN)

( * ) Notice: Subject to any disclaimer, the term of this patent is extended or adjusted under 35 U.S.C. 154(b) by 0 days.

(21) Appl. No.: 16/509,495

(22) Filed: Jul. 12, 2019

(65) Prior Publication Data
US 2020/0174037 A1    Jun. 4, 2020

(30) Foreign Application Priority Data
Nov. 30, 2018   (CN) .......................... 2018 1 1457122

(51) Int. Cl.
| | | |
|---|---|---|
| *G01Q 60/28* | (2010.01) | |
| *G01Q 10/04* | (2010.01) | |
| *G01Q 60/38* | (2010.01) | |
| *E21B 49/08* | (2006.01) | |

(52) U.S. Cl.
CPC ............. *G01Q 60/28* (2013.01); *E21B 49/08* (2013.01); *G01Q 10/045* (2013.01); *G01Q 60/38* (2013.01); *E21B 49/0875* (2020.05)

(58) Field of Classification Search
CPC ...... G01Q 60/28; G01Q 10/045; G01Q 60/38; E21B 49/08; E21B 49/0875; G01N 19/04
USPC ............................................ 850/33, 35, 40
See application file for complete search history.

(56) References Cited

U.S. PATENT DOCUMENTS

2008/0105044 A1 * 5/2008 Yasutake ................ G01Q 60/38
73/105

* cited by examiner

*Primary Examiner* — Michael Maskell

(57) ABSTRACT

A testing device for testing adhesion force includes a thermal insulated glove box, an atomic force microscope, a cryogenic sample stage, a high pressure gas source and a circulating chiller. The atomic force microscope includes a probe for adhering mineral particles. The cryogenic sample stage is configured for preparing gas hydrate sample. The cryogenic sample stage is arranged below the probe. The atomic force microscope and the cryogenic sample stage are placed in the thermal insulated glove box. The high pressure gas source provides pressure required for synthesis of gas hydrates, the high pressure gas source comprises a high pressure chamber covered on the cryogenic sample stage and a high pressure gas cylinder connected with the high pressure chamber. The circulating chiller, an outlet of the circulating chiller is connected with the thermal insulated glove box to control humidity and temperature inside the thermal insulated glove box.

12 Claims, 4 Drawing Sheets providing a testing device, wherein the testing device comprises:

a thermal insulated glove box;

an atomic force microscope comprising a probe for adhering mineral particles;

a cryogenic sample stage for preparing gas hydrate sample, wherein the cryogenic sample stage is arranged on the carrier stage of the atomic force microscope, and wherein the atomic force microscope and the cryogenic sample stage are placed in the thermal insulated glove box;

a high pressure gas source provides pressure required for synthesis of gas hydrates, the high pressure gas source comprises a high pressure chamber covered on the cryogenic sample stage and a high pressure gas cylinder connected with the high pressure chamber; and a circulating chiller, an outlet of the circulating chiller is connected with the thermal insulated glove box to control humidity and temperature inside the thermal insulated glove box — 301

↓ adhering mineral particles using the probe; — 302

↓ preparing gas hydrate sample — 303

↓ adjusting temperature of air inside the insulation glove box insulation glove box — 304

↓ testing adhesion force between the gas hydrate and the mineral particles — 305

FIG.3

TESTING DEVICE AND METHOD FOR MEASURING ADHESION FORCE BETWEEN GAS HYDRATE AND MINERAL PARTICLES

CROSS REFERENCE TO RELATED APPLICATION

This application claims the priority of Chinese Patent Application No. 2018114571228, filed on Nov. 30, 2018, the disclosure of which is incorporated herein by reference in its entirety.

FIELD

The subject matter herein generally relates to a filed of testing adhesion force of micro-particles, in particular to a testing device for testing adhesion force between gas hydrate and mineral particles and testing method.

BACKGROUND

Gas hydrate is one of the most potential unconventional and clean alternative energy sources besides shale gas, coal seam and dense gas. It is mainly an ice-like "clathrate compound" formed by methane or other small gas molecular (such as ethane, propane and carbon dioxide) and water molecular at high pressure and low temperature. Exploitation and utilization of gas hydrate to alleviate energy shortage pressure and structural adjustment of energy is significant. But how to be long-term, steady, safe and efficient exploitation of gas hydrate has been a difficult problem in academic and engineering fields. The mechanical stability of gas hydrate formation and well wall in the process of exploitation is related to the success or failure of the hydrate development project. In China's shenhu sea, the gas hydrate is mainly distributed in fine-grained sediment. The size of mineral particles is in a range from about 8 to 63 μm, and the clay content is high, so the mechanical behavior of gas hydrate and mineral particle is studied at pore scale. In particular, the adhesion force between gas hydrate and mineral particles is very important to reveal the characteristics of friction, cohesion and relative movement between gas hydrate and mineral particles, and to evaluate the reservoir, the wellbore mechanical stability.

With an atomic force microscope (AFM), the force-displacement curve has been widely used in the measurement of adhesion force of micro-particles. The micro-particles are adhered to the AFM probe. By changing the voltage of the piezo scanner of AFM, the micro-particles on the probe can move up and down from micron to nano-scale on the sample surface. When the micro-particles are close to the sample to a certain extent, the micro-particles will adhere to the sample surfaces. Once the micro-particles and sample surfaces are in contact, the probe cantilever will deflect. The deflection was measured by optical method and the deflection signal was recorded. The force between micro-particles and sample surfaces is the deflection multiplied by the spring constant and sensitivity of the probe. The relationship between force and position of piezo scanner is called force-displacement curve. Then the micro-particles move upward and pull off from sample surfaces. The force that separates the micro-particles from the surface of the sample is the adhesion force. Generally, AFM can only be tested at atmospheric pressure, and its detection laser will heat the probe. When temperature of the probe is higher than the gas hydrate phase equilibrium temperature, it will induce gas hydrates phase transition. Therefore, how to maintain the gas hydrate sample stability in the process of testing is the key problem of the technique applying to gas hydrate testing. In order to introduce the technique of force-displacement curve into the field of testing the mechanical behavior between gas hydrate and mineral particles. The present invention provides a solution to how to maintain the gas hydrate sample stability and reduce the AFM probe temperature.

Therefore, there is room for improvement within the art.

BRIEF DESCRIPTION OF THE DRAWINGS

Implementations of the present technology will now be described, by way of embodiments only, with reference to the attached figures.

FIG. 3 is a flowchart of adhesion force testing method for the device for measuring adhesion force between gas hydrate and mineral particles in FIG. 1.

DETAILED DESCRIPTION

Figure 1:
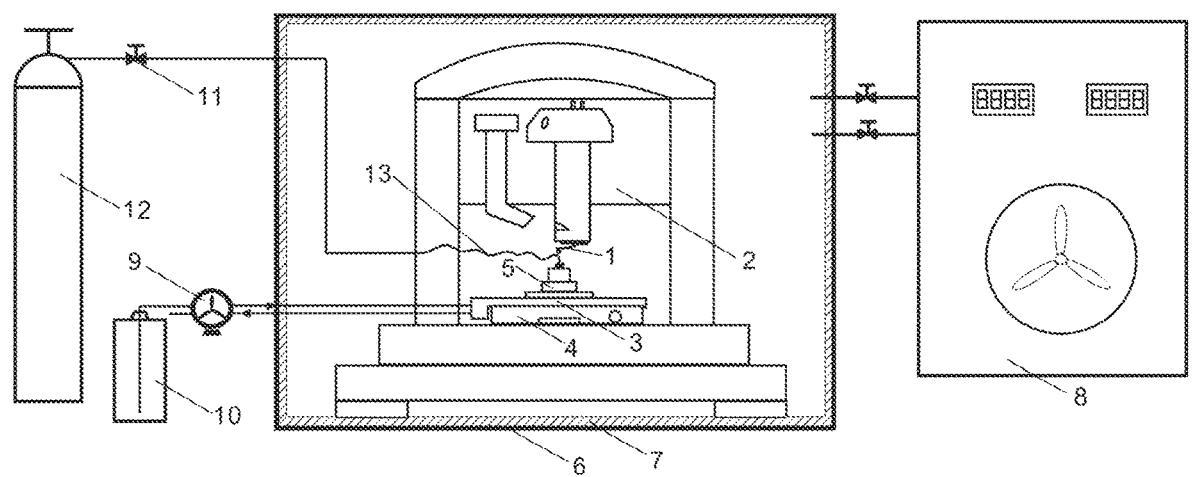
FIG. 1 is a schematic diagram of a testing device for measuring adhesion force between gas hydrate and mineral particles in accordance with one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better. The disclosure is illustrated by way of embodiments and not by way of limitation in the figures of the accompanying drawings, in which like references indicate similar elements. It should be noted that references to "an" or "one" embodiment in this disclosure are not necessarily to the same embodiment, and such references mean "at least one."

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

FIG. 1 illustrates a testing device 100 for measuring adhesion force between gas hydrate and mineral particles according to one embodiment. The testing device 100 includes an atomic force microscope (AFM) 2, a cryogenic sample stage 3, a thermal insulated glove box 6, a circulating chiller 8 and a high pressure gas source.

The AFM 2 includes a probe 1. A cantilever back of the probe 1 is coated with an aluminum layer or a gold coating layer. The cantilever of the probe 1 is rectangular and the probe 1 has no tip.

The high pressure gas source includes a high pressure chamber 5, a high pressure gas cylinder 12, a reducing valve 11, a flexible tube 13 connecting the high pressure chamber 5 and the high pressure gas cylinder 12. The high pressure cavity 5 is connected with an outlet of the high pressure gas cylinder 12. The high pressure gas source provides pressure required for synthesis of gas hydrates. The atomic force microscope 2 and the cryogenic sample stage 3 are placed in the thermal insulated glove box 6. The cryogenic sample stage 3 is installed on the carrier stage 4 of the atomic force microscope 2. The high pressure chamber 5 is connected to the cryogenic sample stage 3 when gas hydrate samples are prepared, and the high pressure chamber 5 is removed from the cryogenic sample stage 3 when adhesion force testing. An outlet of the circulating chiller 8 is connected with the thermal insulated glove box 6 and the circulating chiller 8 is used to reduce humidity and control temperature of air inside the thermal insulated glove box 6.

The testing device further includes a pump 9 and a liquid nitrogen tank 10. The pump 9 is configured to pump low temperature nitrogen vaporized from the liquid nitrogen tank 10 to the cryogenic sample stage 3 for refrigeration of the cryogenic sample stage 3. Temperature of the cryogenic sample stage 3 is controlled in a range from minus 190° C. to a room temperature, in the embodiment, the room temperature is about 25° C.

One end of the high pressure cavity 5 is connected with the cryogenic sample stage 3 and sealed through flange threads. The high pressure cavity 5 is covered on the cryogenic sample stage 3 during synthesis of gas hydrate, and the other end of the high pressure cavity 5 is connected with the high pressure gas cylinder 12. The high pressure cavity 5 can withstand a pressure of gas up to about 10 MPa. When processing a test of adhesion force, the high pressure cavity 5 is removed.

The thermal insulated glove box 6 is an airtight thermal insulated glove box, and an inner surface of the thermal insulated glove box 6 is attached a thermal insulating layer 7. An outlet of the circulating chiller 8 is connected with the thermal insulated glove box 6. The circulating chiller 8 is used for circulating the air in the thermal insulated glove box 6 and lower the humidity and temperature of the air. The circulating chiller 8 is configured to extract the air in the thermal insulated glove box 6, and then pump it into the thermal insulated glove box 6 after cooling. Cooling temperature of the air causes the water vapor in the air to be condensed into ice cream and separated from the dry air, and then the dry air is discharged into the thermal insulated glove box 6. So, the air in the thermal insulated glove box 6 is cooled down and dried. Temperature at the outlet of the circulating chiller 8 is controlled in a range from minus 120° C. to room temperature, and the thermal insulation layer 7 in the thermal insulated glove box 6 is able to maintain temperature stability of the air. In the embodiment, the room temperature is about 25° C.

FIG. 3 illustrates a method for testing adhesion force between gas hydrate and mineral particles according to one embodiment. The method 300 is provided by way of embodiment as there are a variety of ways to carry out the method. The method 300 can begin at block 301.

At block 301, a probe for the atomic force microscope 6 is selected. In the embodiment, the probe 1 can be selected as follows: a cantilever back of the probe 1 is coated with an aluminum layer or a gold coating layer, a cantilever of a probe is rectangular, and a tip of the probe has no tip.

When determining an spring constant of the probe 1, the following factors are generally considered: (1) a relationship between an elastic constant of the probe 1 and a size of mineral particles is approximately linear increase. (2) the test is unstable if the spring constant of the probe is less than 0.4 N/m at low temperature, in the embodiment, the low temperature is in a range from minus 190° C. to room temperature. (3) the smaller the spring constant of the probe 1 is, the better the sensitivity of the probe 1 is, and more accurate of the adhesion force is.

At block 302, the probe 1 is driven to adhere the mineral particles 15. The steps can be carried out as follows: the mineral particles 15 are dispersed in water or anhydrous ethanol. A substrate 13 is placed on the cryogenic sample stage and a small amount of cloud droplets are dripped on a surface of the substrate 13. The substrate 13 is mica sheet or silicon sheet, and the deposited mineral particles 15 are dispersed on the surface of the substrate 13 after the cloud droplets evaporation is completed. A small amount of glue 14 is dipped with a fine rod, and a glue line is drawn on the surface of the substrate 14 using the fine rod. The glue 14 showed a linear shape attachment to the surface of the substrate 13. Using the atomic force microscope 2 to manipulate the probe 1 and the cryogenic sample stage 3, to let the end of the probe 1 dip the glue 14 and adhere the mineral particles 15 immediately.

At block 303, gas hydrate samples are prepared.

The block 303 is carried as follows: the other substrate 13 is placed on the cryogenic sample stage 3. In the embodiment, the substrate 13 is mica sheet. A small amount of deionized water is dripped on the substrate 13, and lower the temperature of the deionized water below zero degrees Celsius to frozen the deionized water. And then high pressure cavity 5 is covered on the cryogenic sample stage 3. High pressure gases, such as methane, or carbon dioxide, or xenon gas, or methane ethane propane mixture, are injected into the high pressure cavity 5. When the pressure is stabilized, rise the temperature of cryogenic sample stage 3 to above zero degrees Celsius, for example, about 1° C. When the temperature is stable, low the temperature below zero degrees Celsius again. At last, the temperature is lowered below the phase equilibrium temperature of gas hydrate after cycle the step of rising and lowing temperature several times.

Block 304, temperature of air inside the insulation glove box 6 is adjusted.

The block 304 is carried as follows:

Temperature of the outlet of the circulating chiller 8 is adjusted so that the air temperature in the insulation glove box 6 is at least lower than that of the cryogenic sample stage 6, and the temperature difference is ΔT, and ΔT meets the formula:

$$\Delta T = 1000 \frac{kPL}{\lambda BD}$$

Where, k refers to a ratio of laser heat conversion, and generally k≈0.1; P refers to laser power, and P≈1 mW; λ refers to a thermal conductivity of the probe 1, the unit is W/° C.·m, L refers to a length of the probe 1, and unit of L is µm; B refers to a width of the probe 1, and unit of B is µm; and D refers to thickness of the probe 1, and unit of D is µm.

Block 305, adhesion force between the gas hydrate and the mineral particles is measured.

Figure 4:
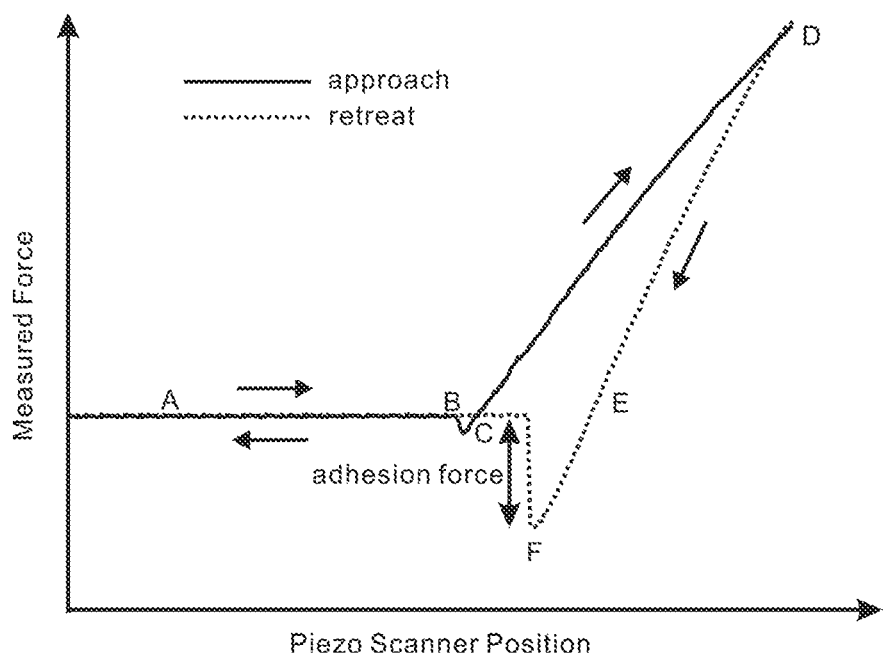
FIG. 4 is a diagram of a typical force-displacement curve.

The Block 305 is carried as follows: the probe 1 with the mineral particle 15 is used to test the sapphire super hard material, and a sensitivity of the probe 1 is obtained. In the embodiment, a force-displacement curve is obtained and the slope of the line segment DE in the FIG. 4 is set as the sensitivity of the probe 1. Then, the adhesion force between gas hydrate sample and mineral particle is tested. The force-displacement curve of atomic force microscope was obtained and the force for gas hydrate separation from mineral particles was considered as the adhesion force, as shown in the FIG. 4.

The present invention is further described in detail in combination with the testing experiment of the adhesion force between carbon dioxide hydrate and mineral particles in the embodiment of the invention.

Figure 2:
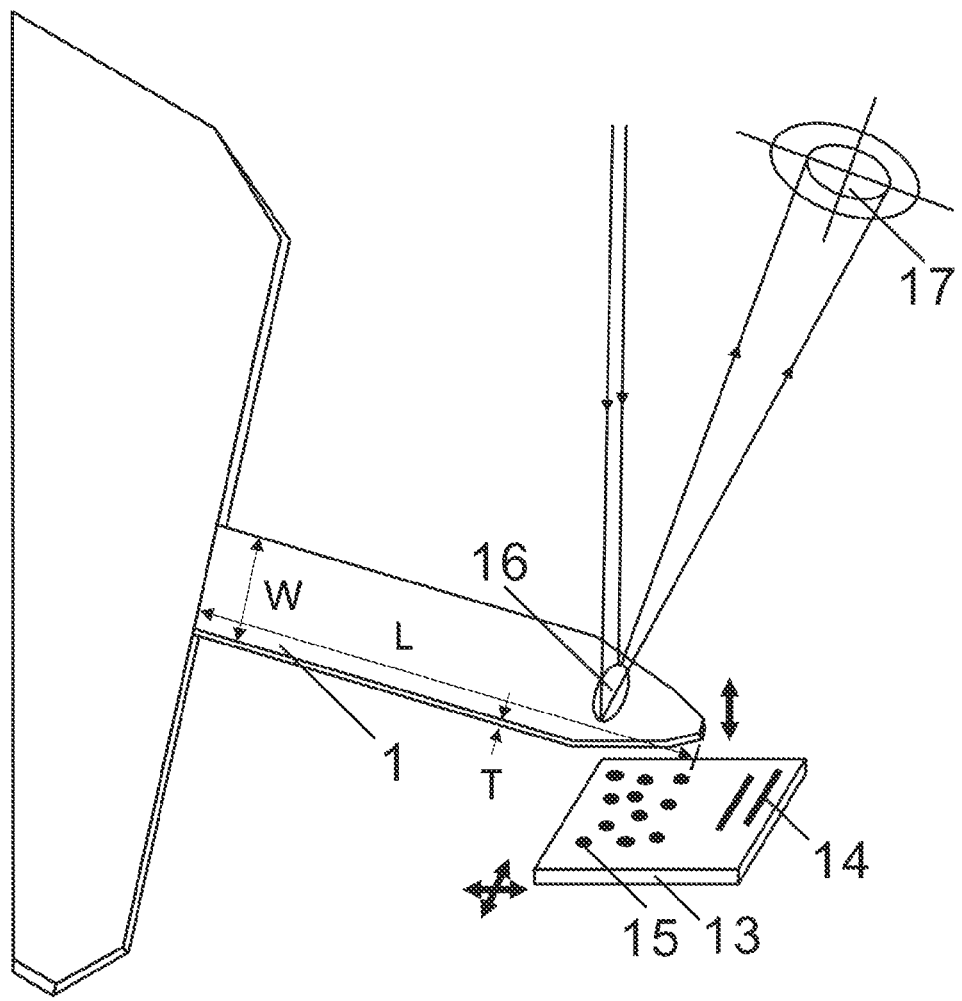
FIG. 2 is a schematic diagram of adhering mineral particles method with the device in FIG. 1.

S1, a probe of the AFM is selected:

In the embodiment, a probe of the AFM 2 is a silicon probe and an aluminum layer is coated on its back, and cantilever of the probe 1 is rectangular and tip-free, as shown in FIG. 2.

In this embodiment, the particle size of mineral particles is about 20 µm, and an spring constant of the probe 1 is about 35 N/m. A length L of the probe 1 is about 115 µm, a width W of the probe 1 is about 35 µm, and a thickness T of the probe 1 is about 3 µm.

S2, adheres mineral particles using the probe 1: the mineral particles 15 were uniformly dispersed in deionized water to form a cloud droplet. A small amount of the cloud droplets were prepared on a surface of the mica substrate 13, and the mineral particles 15 dispersed on the surface of the mica substrate 13 after the evaporation of clear water, as shown in FIG. 2. A small amount of the glue 14 was dipped with a fine rod, and at least one line was drawn on the surface of the mica substrate 13, and the linear glue 14 attached on the surface of the mica substrate 13. Then the cryogenic sample stage 3 is moved by the carrier stage 4 of the atomic force microscope 2, so that the end of the probe 1 is just above the edge of the linear glue 14, and then the probe 1 is driven down to move close to the linear glue 14. When the probe 1 is adhered to the linear glue 14, the voltage value on the position sensitive photo-detector 17 of atomic force microscope 2 will change abruptly. At the moment, the probe 1 will move upward to separate from the linear glue 14 and a small amount of glue will stick to the end of the probe 1. Then the end of the probe 1 was moved to the top of mineral particle 15, and the mineral particles 15 were adhered to the mineral particles by the same operation.

S3, temperature of air in the insulation glove box 6 is adjusted.

The phase equilibrium temperature of carbon dioxide hydrate under normal pressure is about minus 56° C. In order to maintain stability of carbon dioxide hydrate during testing, the temperature of the carbon dioxide hydrate sample needs to be controlled below the phase equilibrium temperature. At the same time, the laser 16 of atomic force microscope 2 focus on the back of the cantilever of the probe 1, and causes temperature of the end of the probe 1 and the mineral particle 15 to be higher than the ambient temperature, and the difference in temperature above the environment is calculated according to the following formula:

$$\Delta T = 1000 \frac{kPL}{\lambda BD}$$

Where, k is referred to a ratio of laser heat conversion, and k≈0.1; P is referred to laser power, and P≈1 mW; λ is referred to a thermal conductivity of the probe 1, the unit is W/° C.·m, L is referred to a length of the probe 1, and unit of L is µm; B is referred to a width of the probe 1, and unit of B is µm; and D is referred to thickness of the probe 1, and unit of D is µm. In the embodiment, L=115 µm, B=35 µm, D=3 µm, and a silicon probe with a thermal conductivity of 150 W/° C.·m was selected, the temperature difference is calculated according to the formula and ΔT=0.73° C.

If the temperature of the mineral particle 15 is higher than the phase equilibrium temperature of the sample, the sample is easy melt and lead to a wrong test results. In order to prevent the sample from melting during the test process, the temperature of the outlet of the circulating chiller 8 is set at least 0.73° C. below the sample temperature. In the embodiment, the temperature of the sample is set about minus 58° C. and the circulating chiller 8 is set about minus 60° C. When the temperature of the air in the heat preservation glove box 6 and the temperature of the probe is stable, the next operation will be carried out.

S4, carbon dioxide hydrate sample is prepared:

First, temperature of the cryogenic sample stage 3 is heated to 2° C., and about 5 microliters of deionic water were dripped on the cryogenic sample stage 3; second, a fresh mica sheet is provided and sticked on the cryogenic sample stage 3, and the mica sheet is used as a substrate 13; third, about 30 microliters of deionized water is dripped on a surface of the substrate 13, and the deionized water is lowered temperature to solidify into ice; fourth, the high pressure chamber 5 is covered on the cryogenic sample stage 3, and the high pressure chamber 5 seals the cryogenic sample stage 3 using bolts; then, a valve 11 of the high pressure gas source 12 is opened and a high pressure carbon dioxide gas is injected into the high pressure chamber 5, until pressure of the high pressure chamber 5 is stabilized at 2 Mpa, rise temperature of the cryogenic sample stage 3 to 2° C., when the temperature is stable, maintain the state for about 15 minutes, the carbon dioxide gas is dissolved in the water. Carbon dioxide hydrate nucleation was induced by cooling the temperature of the cryogenic sample stage 3 to minus 30° C.; When the temperature is stabilized, and then the cryogenic sample stage 3 is heated to 2° C., the ice in the cryogenic sample stage 3 is melt completely, and cycling up and down temperature 3 or 4 times and then rise to 2° C. and maintain for 15 minutes, so that the pure carbon dioxide hydrate can be prepared quickly. Finally, cool down to minus 58° C. and remove the high pressure chamber 5 to prepare the sample adhesion test.

S5, an adhesion force between the carbon dioxide hydrate and the mineral particles is tested. Position of the laser 16 emitted from the atomic force microscope 2 on the probe 1 is adjusted, super-hard materials such as sapphire is tested by the probe 1 with the mineral particle 15, and a force-displacement curve is obtained. The slope of line segment DE of force displacement curve in FIG. 4 is set as the sensitivity of the probe 1. Then the carbon dioxide hydrate samples were tested by the same method and the force-displacement curve was obtained. When the carbon dioxide hydrate was separated from the mineral particle 15, the force needed is the adhesion force between the gas hydrate and the mineral particle 15.

The present disclosure provides a testing device and method for testing adhesion force between gas hydrate and mineral particles. The gas hydrate sample can be synthesized in situ on the cryogenic sample stage, and mineral particles stick to the cantilever end of the AFM probe.

The testing device in the disclosure utilizes the AFM force curve technology, thus, the adhesion force between gas hydrate and mineral particles is obtained at low temperature and normal pressure. This method can conveniently and accurately test the adhesion force between hydrate and mineral particles. It is of great practical value for evaluating the mechanical properties of hydrate reservoirs and guiding the exploitation of hydrate in sea area.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A testing device for testing adhesion force between gas hydrate and mineral particles comprising: a thermal insulated glove box;
an atomic force microscope for measuring adhesion force and sticking mineral particles by manipulating the probe; a cryogenic sample stage for preparing gas hydrate sample, the cryogenic sample stage is fixed on the carrier stage of the atomic force microscope, So the cryogenic sample stage can move in the horizontal plane by manipulating the carrier table, wherein the atomic force microscope and the cryogenic sample stage are placed in the thermal insulated glove box;
a high pressure gas source provides pressure required for synthesis of gas hydrates, the high pressure gas source comprises a high pressure chamber covered on the cryogenic sample stage and a high pressure gas cylinder connected with the high pressure chamber; and
a circulating chiller, an outlet of the circulating chiller is connected with the thermal insulated glove box to control humidity and temperature inside the thermal insulated glove box.

2. The testing device of claim 1, wherein:
the testing device further comprises a pump and a liquid nitrogen tank, the pump is configured to pump low temperature nitrogen vaporized from liquid nitrogen tank to the cryogenic sample stage for refrigeration of the cryogenic sample stage.

3. The testing device of claim 1, wherein:
the thermal insulated glove box is an airtight thermal insulated glove box, and the inner surface of the thermal insulated glove box is attached a thermal insulating layer.

4. The testing device of claim 1, wherein:
the circulating chiller extracts the air in the thermal insulated glove box, and then pump it into the thermal insulated glove box after cooling.

5. The testing device of claim 1, wherein:
temperature of the cryogenic sample stage is controlled in a range from minus 190° C. to 25° C.

6. The testing device of claim 1, wherein:
the high pressure cavity is sealed connecting with the cryogenic sample stage.

7. The testing device of claim 1, wherein:
the probe comprises a cantilever, and back of the cantilever is coated with an aluminum layer or a gold coating layer.

8. The testing device of claim 7, wherein:
a cantilever of the probe is rectangular, and the probe has no tip.

9. A method for testing adhesion force between gas hydrate and mineral particles comprising:
providing a testing device, wherein the testing device comprises:
a thermal insulated glove box;
an atomic force microscope comprising a probe for adhering mineral particles;
a cryogenic sample stage for preparing gas hydrate sample, wherein the cryogenic sample stage is arranged on the carrier stage of the atomic force microscope, and wherein the atomic force microscope and the cryogenic sample stage are placed in the thermal insulated glove box;
a high pressure gas source provides pressure required for synthesis of gas hydrates, the high pressure gas source comprises a high pressure chamber covered on the cryogenic sample stage and a high pressure gas cylinder connected with the high pressure chamber; and
a circulating chiller, an outlet of the circulating chiller is connected with the thermal insulated glove box to control humidity and temperature inside the thermal insulated glove box;
adhering mineral particles on the end of the probe;
preparing gas hydrate sample;
adjusting temperature of air inside the insulation glove box; and
testing adhesion force between the gas hydrate and the mineral particles.

10. The method of claim 9, wherein:
the step of adhering mineral particles using the probe comprising:
providing a plurality of mineral particles;
dispersing the mineral particles in water or anhydrous ethanol;
disposing a substrate on the cryogenic sample stage;
dripping a small amount of cloud droplets on a surface of the substrate;
dipping a small amount of glue with a fine rod, and drawing a line on the surface of the substrate using the fine rod, and the glue showing a linear shape attachment to the surface of the substrate;
using the atomic force microscope to manipulate the probe, to let the end of the probe dip the glue and adhere the mineral particles.

11. The method of claim 10, wherein:
the step of preparing gas hydrate sample comprising:
dripping a small amount of deionized water on the substrate, and lower temperature of the deionized water below zero degrees Celsius;
covering the high pressure cavity on the cryogenic sample stage;
pumping high pressure gases into the high pressure cavity until pressure stabilizes of the high pressure cavity; and
adjusting the temperature below the phase equilibrium temperature of gas hydrate at atmospheric pressure.

12. The method of claim 11, wherein:
the step of adjusting temperature of air inside the insulation glove box comprises:
adjusting temperature of an outlet of the circulating chiller to let temperature of air in the insulation glove box is lower than temperature of the cryogenic sample stage, and a temperature difference is ΔT, and ΔT meets the formula:

$$\Delta T = 1000 \frac{kPL}{\lambda BD}$$

wherein in the formula, k refers to a ratio of laser heat conversion, and k≈0.1; P refers to laser power, and P≈1 mW; λ refers to a thermal conductivity of the probe, the unit is W/° C.·m, L refers to a length of the probe, and unit of L is μm; B refers to a width of the probe, and unit of B is μm; and D refers to thickness of the probe, and unit of D is μm.

* * * * *